US012384152B2

(12) United States Patent
Tachibana et al.

(10) Patent No.: US 12,384,152 B2
(45) Date of Patent: Aug. 12, 2025

(54) LIQUID EJECTION HEAD AND LIQUID EJECTION APPARATUS

(71) Applicant: CANON KABUSHIKI KAISHA, Tokyo (JP)

(72) Inventors: Koji Tachibana, Kanagawa (JP); Shingo Okushima, Kanagawa (JP); Takuya Iwano, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 163 days.

(21) Appl. No.: 18/126,684

(22) Filed: Mar. 27, 2023

(65) Prior Publication Data

US 2023/0311507 A1 Oct. 5, 2023

(30) Foreign Application Priority Data

Mar. 30, 2022 (JP) ................................ 2022-056933

(51) Int. Cl.
*B41J 2/14* (2006.01)

(52) U.S. Cl.
CPC .... *B41J 2/1433* (2013.01); *B41J 2002/14491* (2013.01)

(58) Field of Classification Search
CPC ...................... B41J 2/1433; B41J 2002/14491
See application file for complete search history.

(56) References Cited

U.S. PATENT DOCUMENTS

| | | | | |
|---|---|---|---|---|
| 8,480,208 B2 | | 7/2013 | Takemoto et al. | |
| 9,789,686 B2 | * | 10/2017 | Togashi | B41J 2/14233 |
| 10,882,317 B2 | | 1/2021 | Naito et al. | |
| 2009/0102907 A1 | * | 4/2009 | Yamanaka | B41J 2/14274 347/94 |
| 2013/0106944 A1 | * | 5/2013 | Hisanaga | C08G 59/40 523/400 |
| 2015/0052752 A1 | | 2/2015 | Sakai et al. | |
| 2017/0197439 A1 | | 7/2017 | Okushima et al. | |

FOREIGN PATENT DOCUMENTS

JP 2011-110743 A 6/2011

OTHER PUBLICATIONS

Extended European Search Report dated Aug. 9, 2023, in European Patent Application No. 23163624.2.

* cited by examiner

*Primary Examiner* — Jason S Uhlenhake
(74) *Attorney, Agent, or Firm* — Venable LLP

(57) ABSTRACT

To improve the structural reliability of a liquid ejection head, the liquid ejection head includes a first substrate having ejection ports, liquid chambers, and energy generation elements, and a second substrate joined to a second surface of the first substrate situated opposite to its first surface. The first substrate includes projecting areas projecting from end portions of the second substrate in a planar direction perpendicular to a first-axis direction (z-axis direction). Terminals to be electrically connected to the energy generation elements are provided at the second surfaces of the projecting areas. A support member is joined to the first surface of the first substrate, has an opening at a position opposed to where the ejection ports are formed, and is fixed to the frame.

15 Claims, 10 Drawing Sheets

LIQUID EJECTION HEAD AND LIQUID EJECTION APPARATUS

BACKGROUND OF THE INVENTION

Field of the Invention

The present disclosure relates to a liquid ejection head and liquid ejection apparatus that eject a liquid from an ejection port.

Description of the Related Art

In liquid ejection apparatuses that form an image by ejecting a liquid, a plurality of ejection ports provided in a liquid ejection head and energy generation elements that eject the liquid from the ejection ports are densely disposed on a substrate so that images to be formed will have a high resolution. In a case where electric power is supplied to the energy generation elements thus densely disposed though electric wirings densely formed on the substrate, ionic migration occurs at the electric wiring parts. This may lower the electric reliability of the liquid ejection apparatus.

To avoid such a problem, the liquid ejection head described in Japanese Patent Laid-Open No. 2011-110743 discloses a configuration in which a plurality of terminals for electric connection are disposed at opposite ends of a chip, and electric power is supplied through wires bonded to the terminals. In the liquid ejection head disclosed in Japanese Patent Laid-Open No. 2011-110743, in order to expose the electric connection terminals on a substrate, the portions where the terminals are disposed are formed in an eave shape.

SUMMARY OF THE INVENTION

In a first aspect of the present invention, there is provided a liquid ejection head comprising: a first substrate having an ejection port that allows a liquid to be ejected along a first-axis direction, a liquid chamber communicating with the ejection port, and an energy generation element that generates an energy for ejecting the liquid in the liquid chamber through the ejection port; and a second substrate joined to a second surface of the first substrate, the second surface being on an opposite side to a first surface of the first substrate in which the ejection port is formed, wherein the first substrate includes a projecting area projecting from an end portion of the second substrate in a planar direction perpendicular to the first-axis direction, and a terminal to be electrically connected to the energy generation element is provided at the second surface of the projecting area, the liquid ejection head further comprising: a support member joined to the first surface of the first substrate and having an opening at a position opposed to an area where the ejection port is formed; and a frame to which the support member is fixed.

In a second aspect of the present invention, there is provided a liquid ejection apparatus comprising: a liquid ejection head; and a conveyance unit configured to convey a print medium with respect to the liquid ejection head, wherein the liquid ejection head includes: a first substrate having an ejection port that allows a liquid to be ejected along a first-axis direction, a liquid chamber communicating with the ejection port, and an energy generation element that generates an energy for ejecting the liquid in the liquid chamber through the ejection port; and a second substrate joined to a second surface of the first substrate, the second surface being on an opposite side to a first surface of the first substrate in which the ejection port is formed, wherein the first substrate includes a projecting area projecting from an end portion of the second substrate in a planar direction perpendicular to the first-axis direction, and a terminal to be electrically connected to the energy generation element is provided at the second surface of the projecting area, the liquid ejection head further including: a support member joined to the first surface of the first substrate and having an opening at a position opposed to an area where the ejection port is formed; and a frame to which the support member is fixed.

Further features of the present invention will become apparent from the following description of exemplary embodiments with reference to the attached drawings.

DESCRIPTION OF THE EMBODIMENTS

It is known that the liquid ejection performance of a liquid ejection head can be improved by thinly forming channels at and near its ejection ports (liquid chambers). Note that thinning the channels will thin a substrate on which terminals are disposed. Thus, in a case of a configuration in which terminals are disposed at eave-shaped portions formed by a substrate projecting from opposite end portions of a liquid ejection chip, as in Japanese Patent Laid-Open No. 2011-110743, thinning the substrate will make the eave-shaped portions easily breakable. This leads to a problem of lowering the structural reliability of the liquid ejection head.

An object of the present disclosure is to provide a technique capable of improving the structural reliability of a liquid ejection head.

A liquid ejection head and liquid ejection apparatus according to the present disclosure will be specifically described below based on embodiments with reference to the drawings. In each of the embodiments below, a liquid ejection head and liquid ejection apparatus will be described by taking an inkjet print head and inkjet printing apparatus that eject ink as an example. However, the present disclosure is not limited to this example. The liquid ejection head and liquid ejection apparatus according to the present disclosure are applicable to apparatuses such as printers, copiers, facsimile machines having a communication system, and word processors having a printer unit, as well as industrial printing apparatuses combining various processing apparatuses. For example, the liquid ejection head and liquid ejection apparatus according to the present disclosure are usable in applications such as fabrication of biochips and printing of electronic circuits.

First Embodiment (Liquid Ejecting Apparatus)

Figure 1:
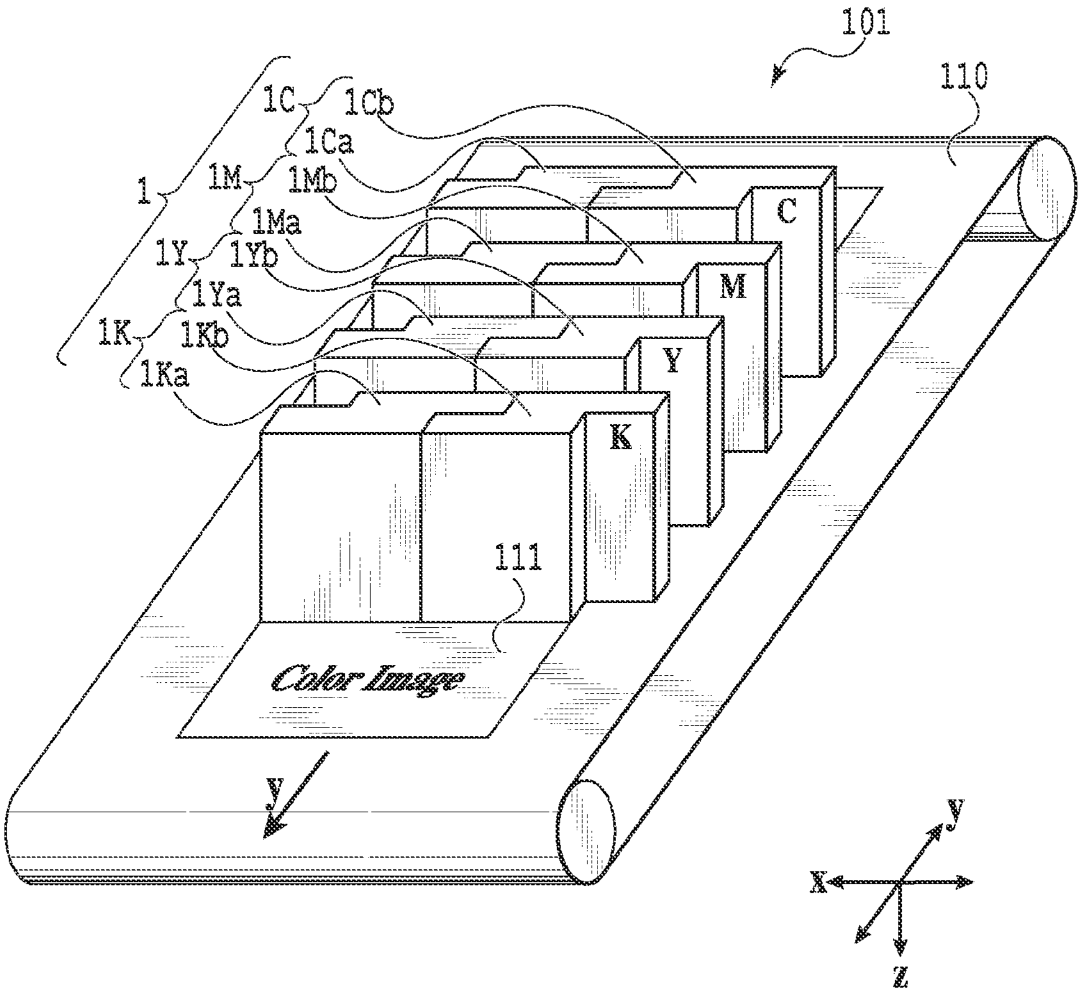
FIG. 1 is a perspective view schematically illustrating an example of an inkjet printing apparatus.

FIG. 1 is a perspective view schematically illustrating an example of an inkjet printing apparatus (hereinafter simply referred to as "printing apparatus") 101 as a liquid ejection apparatus according to the present disclosure. The printing apparatus 101 illustrated in FIG. 1 is what is called a full line-type printing apparatus which prints an image by continuously conveying a print medium 111 in a y-axis direction with a conveyance unit 110, and ejecting inks (liquids) from a printing unit (liquid ejection unit) 1 disposed at a given position. Note that the y, x, and z axes illustrated in each drawing to be referred to in the following description represent coordinate axes of the liquid ejection apparatus, and the z, y, and x axes represent first, second, and third axes, respectively. These axes are perpendicular to each other. Moreover, the z-axis direction (first-axis direction) represents the direction of ink ejection by the liquid ejection unit 1, the y-axis direction (second-axis direction) represents the conveyance direction of the print medium, and the x-axis direction (third-axis direction) represents the array direction of ejection ports in liquid chambers.

The liquid ejection unit 1 has a configuration in which a liquid ejection head (print head) in which ejection ports (also referred to as "nozzles") that allow an ink to be ejected are arrayed over the entire width of the print medium 111 is disposed for each of a plurality of ink colors, the liquid ejection heads being arrayed along the conveyance direction of the print medium (y-axis direction). The printing apparatus 101 in the present embodiment is capable of forming a full-color image by ejecting inks of four colors of black (K), yellow (Y), magenta (M), and cyan (C). Thus, the liquid ejection unit 1 includes liquid ejection heads 1K, 1Y, 1M, and 1C for ejecting the black, yellow, magenta, and cyan inks, respectively.

The liquid ejection heads illustrated in FIG. 1, which eject the inks of the respective colors, each have a configuration in which two head modules are combined. For example, the liquid ejection head 1K for ejecting the black ink has a configuration in which head modules 1Ka and 1Kb are disposed along the x-axis direction (third-axis direction), which is perpendicular to the conveyance direction (y-axis direction). The head modules 1Ka and 1Kb have the same configuration. This also applies to the ejection modules which eject the inks of the other colors.

(Configuration of Head Module)

Figure 2:
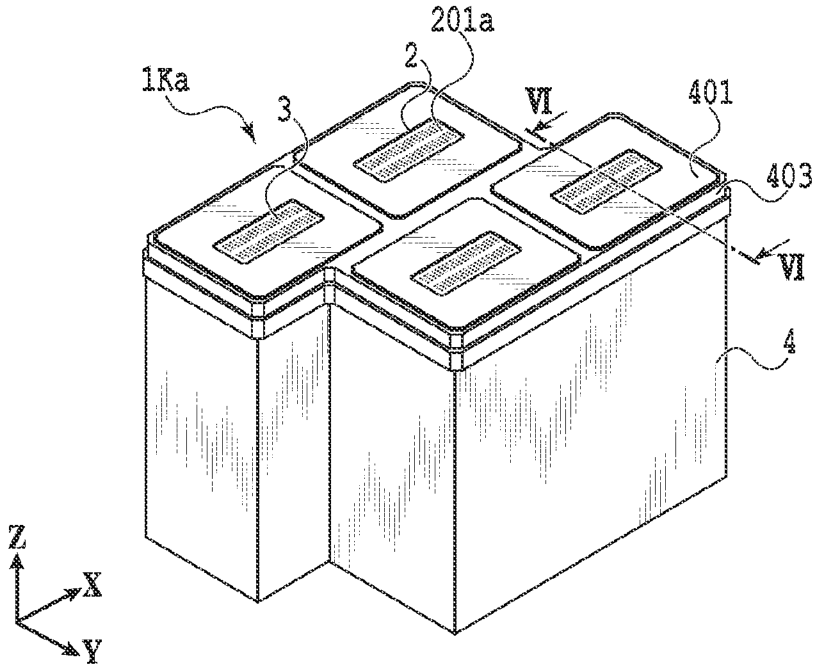
FIG. 2 is an external perspective view illustrating a configuration of a head module.

FIG. 2 is an external perspective view illustrating a configuration of a head module used in a liquid ejection head in the present embodiment. The head module illustrated in FIG. 2 represents one of the two head modules provided to each of the print heads 1K, 1Y, 1M, and 1C illustrated in FIG. 1. FIG. 2 exemplarily illustrates the head module 1Ka used in the print head (liquid ejection head) 1K, and the head modules provided to the other print heads 1Y, 1M, and 1C have similar configurations.

A plurality of liquid ejection chips 2 are disposed in one surface (the upper surface in FIG. 2) of a head main body 4 of the head module 1Ka. In this example, four liquid ejection chips 2 are disposed in a staggered pattern along the x-axis direction. Each liquid ejection chip 2 has an ejection port surface (first surface) 201*a* in which are formed a plurality of ejection ports 3 from which to eject the ink. The ink to be ejected from the ejection ports 3 is supplied to the liquid ejection chip 2 from an ink tank (not illustrated) through a common supply port (not illustrated) in the head main body 4. The liquid ejection chip 2 is supported by a frame 403 and a support member 401 provided at the one surface of the head main body 4. The support structure of the liquid ejection chip 2 with the frame 403 and the support member 401 will be described in detail later.

(Structures of Both Surfaces of Liquid Ejection Chip)

Figure 3A:
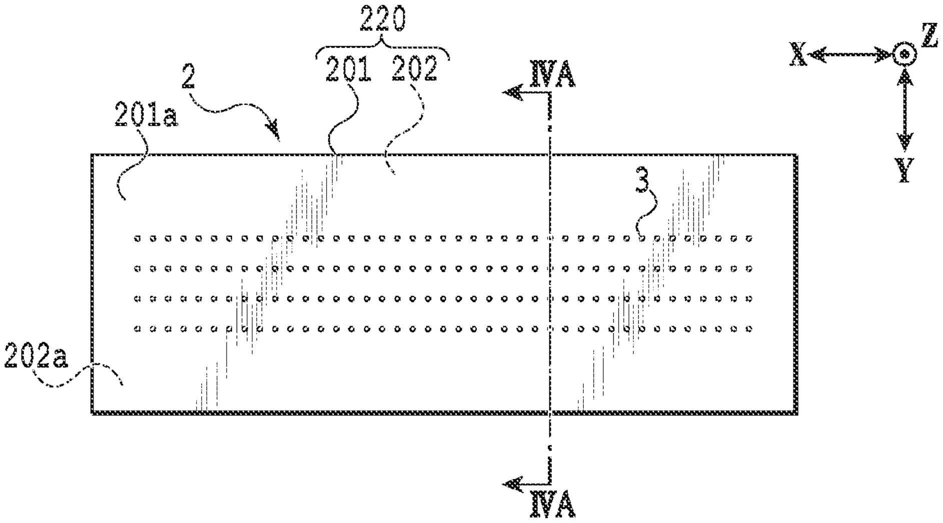
FIGS. 3A and 3B are views illustrating structures of both surfaces of a liquid ejection chip.
Figure 3B:
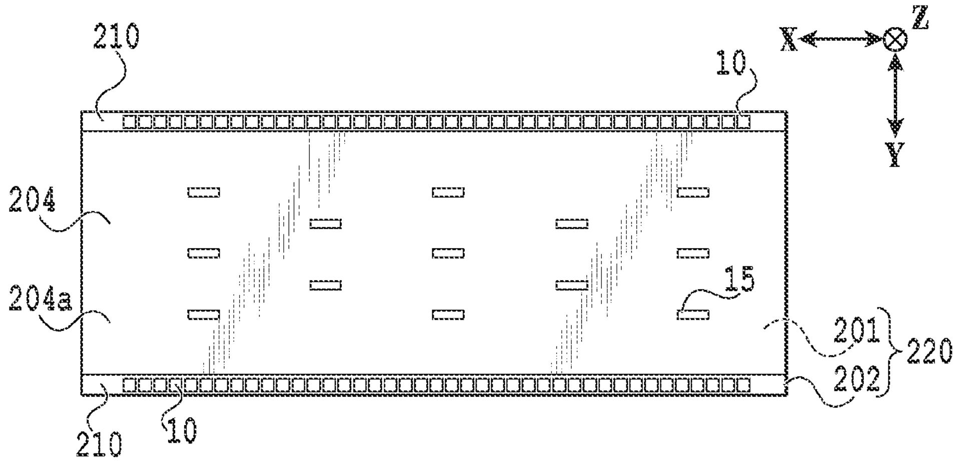

FIGS. 3A and 3B are views illustrating structures of both surfaces of a liquid ejection chip 2 illustrated in FIG. 2. FIG. 3A is a plan view of the liquid ejection chip 2 as seen from the first surface side (ejection port surface 201*a* side). FIG. 3B is a view of the liquid ejection chip 2 as seen from a surface 204*a* side opposite to the ejection port surface 201*a*.

In FIG. 3A, the ejection port surface 201*a* of the liquid ejection chip 2 is formed on a nozzle substrate 201. In the nozzle substrate 201, the plurality of ejection ports 3, from which to eject the ink, are arrayed along the longitudinal direction (x-axis direction) of the nozzle substrate 201 and form ejection port arrays. In this example, a plurality of ejection port arrays are provided side by side in the y-axis direction.

A plurality of substrates (to be described later) are laminated on the nozzle substrate 201 of the liquid ejection chip 2. The surface 204*a* (FIG. 3B) of the liquid ejection chip 2 opposite to the ejection port surface 201*a* is formed by a channel formation substrate 204 (to be described later). In the channel formation substrate 204, there are formed connection channels 15 through which to supply and collect the ink to and from the liquid ejection chip 2. Some of the connection channels 15 communicate with the common supply port (not illustrated) formed in the head main body 4, and the common supply port is connected to the ink tank (not illustrated). In this way, the ink supplied from the ink tank is supplied into the liquid ejection chip 2 through the connection channels 15.

As illustrated in FIG. 3B, a plurality of terminals 10 are disposed on the liquid ejection chip 2. These terminals 10 are disposed on opposite end portions of the liquid ejection chip 2 in order to reduce the density of wirings (not illustrated) inside the liquid ejection chip 2. In the head main body 4 mentioned above, there is disposed an electric substrate for supplying electric power and signals necessary for ejecting the ink from the ejection ports 3. This electric substrate and the terminals 10 are electrically connected to each other.

(Internal Structure of Liquid Ejection Chip)

Figure 4A:
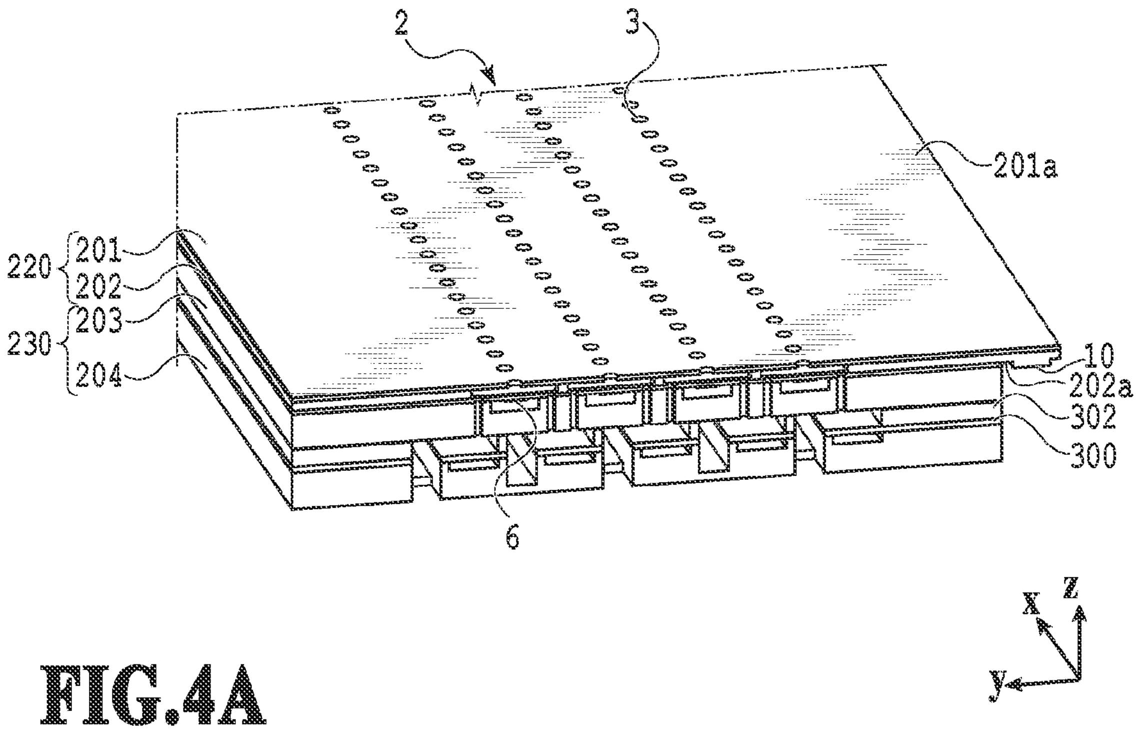
FIGS. 4A and 4B are views illustrating an internal structure of a liquid ejection chip.
Figure 4B:
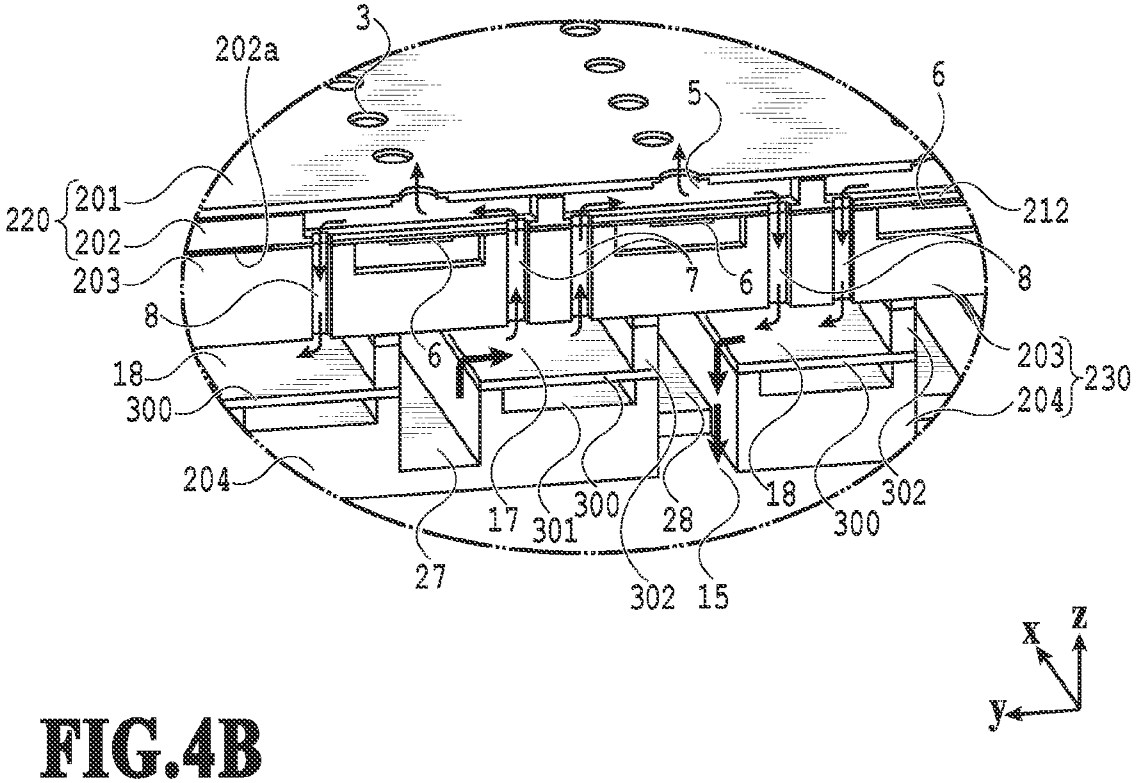

FIGS. 4A and 4B are views illustrating an internal structure of a liquid ejection chip 2. FIG. 4A is a perspective cross-sectional view illustrating a cross section taken along the IVA-IVA line in FIG. 3A. FIG. 4B is a partially enlarged view of FIG. 4A. As illustrated in FIG. 4A, the liquid ejection chip 2 has a structure in which the nozzle substrate 201, a liquid chamber substrate 202, a liquid supply substrate 203, a damper substrate 302, and the channel formation substrate 204 are laminated in this order. In the present embodiment, a laminated substrate including the nozzle substrate 201 and the liquid chamber substrate 202 forms a first substrate 220, and a laminated substrate including the liquid supply substrate 203 and the channel formation substrate 204 forms a second substrate 230.

FIG. 4B is an enlarged perspective view illustrating an enlarged part of FIG. 4A. Between the nozzle substrate 201, in which a plurality of ejection ports 3 are formed, and the liquid chamber substrate 202, which is joined to the nozzle substrate 201, there are formed a plurality of liquid chambers 5 communicating respectively with the plurality of ejection ports 3. In each of the liquid chambers 5, a vibration plate 212 forming a part of the liquid chamber substrate 202 is provided as a deformable wall portion. The liquid chambers 5 form channels communicating with the ejection ports 3. These channels are preferably thin channels whose dimension in the ink ejection direction (z-axis direction) (hereinafter referred to as "thickness") is 200 μm or less in order to exhibit high ejection performance and circulation performance. On the vibration plate 212, a plurality of energy generation elements 6 are provided respectively for the plurality of liquid chambers. By deforming the vibration plate 212, the energy generation elements 6 can pressurize the ink in the liquid chambers 5 and eject the ink from the ejection ports 3.

The liquid supply substrate 203 is joined to a surface (second surface) 202*a* of the liquid chamber substrate 202 situated opposite to its surface joined to the nozzle substrate 201. In the liquid supply substrate 203, there are formed a plurality of individual supply channels 7 and a plurality of individual collection channels 8 communicating respectively with the plurality of liquid chambers 5. Part of the liquid supplied from each individual supply channel 7 to the corresponding liquid chamber 5 is ejected from the corresponding ejection port 3 in response to driving of the corresponding energy generation element 6, and the remaining liquid flows into the corresponding individual collection channel 8. In a case where the energy generation element 6 is not driven, the entire part of the liquid supplied into the liquid chamber 5 flows into the individual collection channel 8.

The plurality of individual supply channels 7 each communicate with a common supply communication path 17 formed by the damper substrate 302. One surface (the upper surface in FIG. 4A) of a damper member 300 provided to this damper substrate 302 faces the individual supply channels 7. Moreover, the other surface (the lower surface in FIG. 4A) of this damper member 300 faces damper areas 301 formed by recesses in the channel formation substrate 204. The common supply communication paths 17 communicate with common supply channels 27 formed in the channel formation substrate 204. The common supply channels 27 communicate with some of the connection channels 15 (see FIG. 3B) formed in the channel formation substrate 204. The ink supplied through these connection channels 15 from the ink tank (not illustrated) provided outside is supplied to the common supply channels 27.

The plurality of individual collection channels 8 each communicate with a common collection communication path 18 formed by the damper substrate 302. The one surface (the upper surface in FIG. 4B) of the damper member 300 provided to this damper substrate 302 faces the individual collection channels 8. Moreover, the other surface (the lower surface in FIG. 4B) of this damper member 300 faces damper areas 301 formed by recesses in the channel formation substrate 204. Common collection channels 28 communicate with some of the connection channels 15 formed in the channel formation substrate 204. The ink having flowed into the common collection channels 28 is collected through the connection channels 15 into the ink tank provided outside.

The nozzle substrate 201, the liquid chamber substrate 202, the liquid supply substrate 203, and the channel formation substrate 204 described above can each be a silicon substrate or the like. In the present embodiment, these substrates are formed as individual substrates. However, the present embodiment is not limited to this case, and the substrates can be formed integrally with each other. Also, the damper member 300 is made of an elastic material. For example, resin materials such as polyimides and polyamides are usable as the elastic material.

The arrows illustrated in FIG. 4B indicate the flow of the ink in the liquid ejection chip 2 configured as above. Specifically, the ink having flowed into the common supply channels 27 from the ink tank outside through some of the connection channels 15 flows into the individual supply channels 7 through the common supply communication paths 17 and is supplied into the liquid chambers 5. Part of the ink supplied into the liquid chambers 5 is ejected from the ejection ports 3 in response to driving of the energy generation elements 6, and the remaining liquid flows into the individual collection channels 8. In a case where any of the energy generation elements 6 is not driven, the entire part of the liquid supplied into the liquid chamber 5 flows into the individual collection channel 8. The ink having flowed into the individual collection channels 8 flows into the common collection channels 28 through the common collection communication paths 18 and are collected into the ink tank outside through some of the connection channels 15.

(Structures of Electric Connection Portions of Liquid Ejection Chip)

Next, a structure of electric connection portions of the liquid ejection chip in the present embodiment will be described with reference to FIGS. 5A to 8.

Figure 5A:
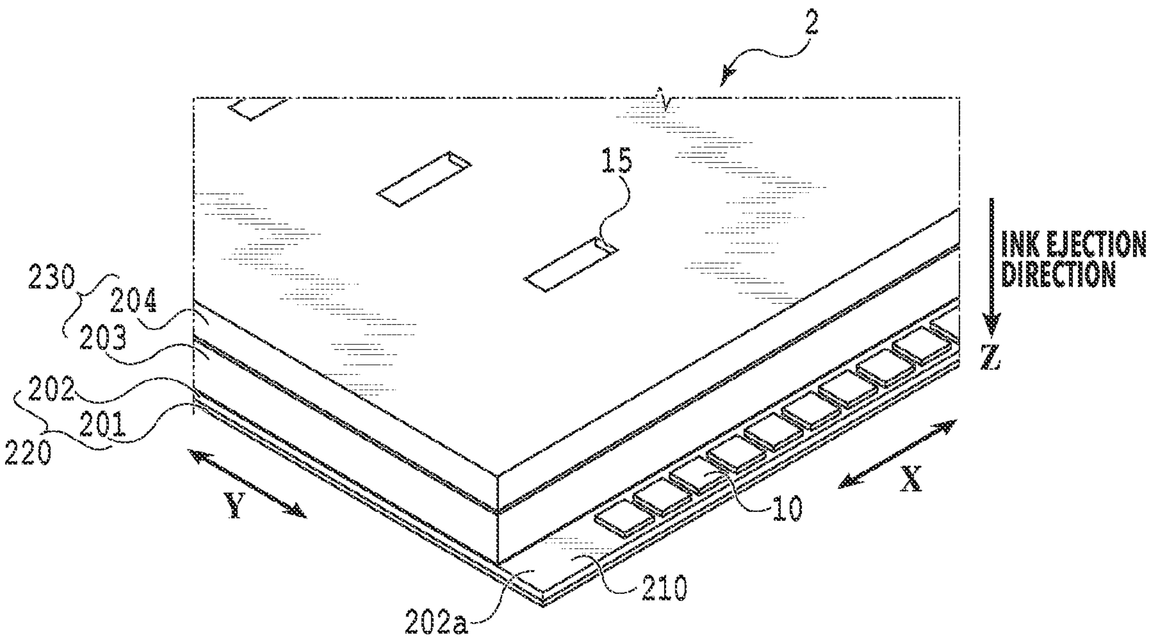
FIGS. 5A and 5B are perspective views of a part of a liquid ejection chip as seen from the opening side of connection channels.
Figure 5B:
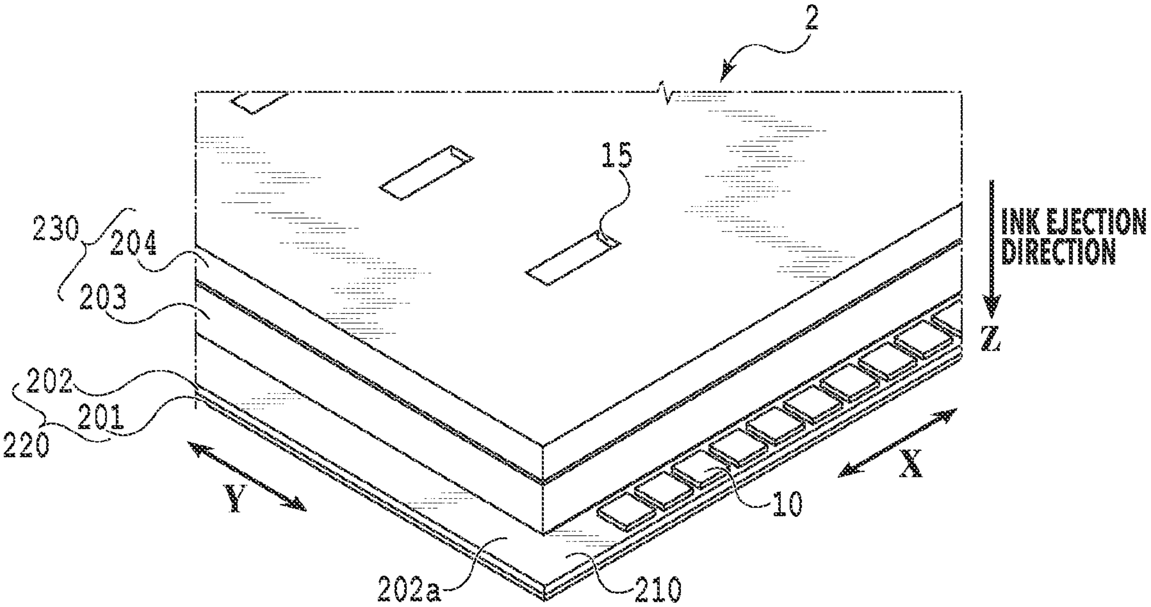

FIGS. 5A and 5B are perspective views of a part of a liquid ejection chip 2 as seen from the opening side of the connection channels 15 formed in the channel formation substrate 204.

The nozzle substrate (ejection port substrate) 201 and the liquid chamber substrate 202 forming parts of the liquid ejection chip 2 have the same shape in the planar direction perpendicular to the ink ejection direction (z-axis direction) and are joined to each other with their end portions coinciding with each other in the planar direction. The nozzle substrate 201 and the liquid chamber substrate 202 form the first substrate 220 including the ejection ports 3, the liquid chambers 5, the vibration plate 212, the energy generation elements 6, and so on illustrated in FIG. 4B.

The first substrate 220 is joined to one surface (the lower surface in FIGS. 5A and 5B) of the liquid supply substrate 203. In the present embodiment, the liquid supply substrate 203 is formed with such dimensions and in such a shape that at least part of areas on the first substrate 220 around its end portions is exposed. Specifically, the liquid supply substrate 203 is formed such that its dimension in at least one direction along the planar direction is smaller than that of the first substrate 220. For example, in the liquid ejection chip 2 illustrated in FIG. 5A, the liquid supply substrate 203 and the first substrate 220 each have a rectangular shape, and the dimension of the liquid supply substrate 203 in the y-axis direction, which is parallel to the planar direction, is smaller than the dimension of the first substrate in the y-axis direction. The peripheral areas of the first substrate 220 at end portions in the y-axis direction are therefore formed as projecting areas 210 projecting in an eave shape from two opposite edges of the liquid supply substrate 203. Hereinafter, these projecting areas 210 will also be referred as the eave portions 210.

As illustrated in FIG. 5B, the configuration can be such that the peripheral areas of the first substrate 220 at end portions in the y-axis direction and the x-axis direction are formed as projecting areas (eave portions) 210 projecting in an eave shape from three or more edges of the liquid supply substrate 203. At the eave portions 210, the plurality of terminals 10 are disposed, which form electric connection portions between the energy generation elements 6 provided on the liquid chamber substrate 202 and the outside. In view of the ink ejection and circulation efficiency, the total thickness of the nozzle substrate 201 and the liquid chamber substrate 202 forming the first substrate 220 is preferably 200 μm or less. This leaves a concern about the structural reliability of the eave portions 210, which are parts of the first substrate 220. Thus, each of the head modules forming the liquid ejection head in the present embodiment has the following configuration at the periphery of the liquid ejection chip 2.

(Peripheral Configuration of Liquid Ejection Chip)

A peripheral configuration of a liquid ejection chip 2 will be described in detail with reference to FIGS. 6 and 7. Although the following description will be given by taking as an example the peripheral configuration of a liquid ejection chip 2 provided to the head module 1Ka used in the liquid ejection head 1K, which ejects the black ink, the other head modules have similar configurations.

Figure 6:
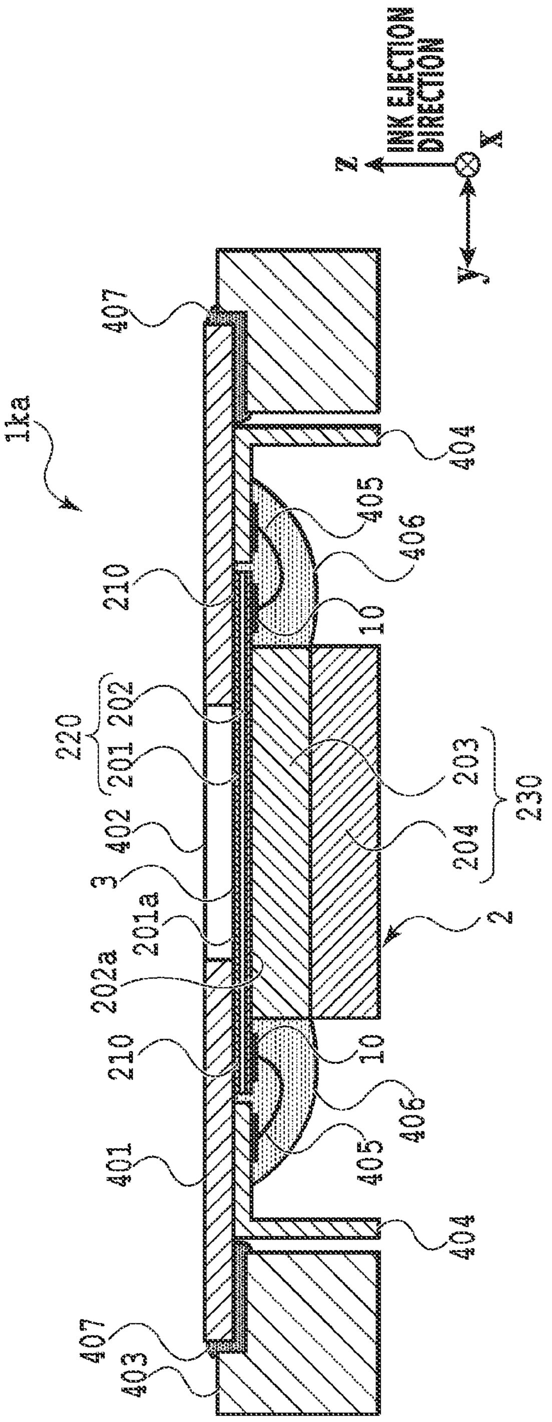
FIG. 6 is a cross-sectional view illustrating a peripheral configuration of a liquid ejection chip in a first embodiment.

FIG. 6 is a cross-sectional view illustrating the peripheral configuration of each of the liquid ejection chips 2 provided in the head modules of the liquid ejection head 1K in the present embodiment, and illustrates a part of a cross section taken along the VI-VI line in FIG. 2. As illustrated in FIG. 6, flexible substrates 404, the support member 401, the frame 403, and so on are mainly provided at the periphery of each liquid ejection chip 2 in the head module 1Ka. The flexible substrates 404 are disposed at positions adjacent to the eave portions 210 of the liquid ejection chip 2 in the planar direction. The flexible substrates 404 are electrically connected to the terminals 10 provided on the surfaces of the eave portions 210 on one side (the lower surfaces in FIG. 6), and their junctions are covered with sealing members 406. FIG. 6 illustrates an example in which the flexible substrates 404 and the terminals 10 are electrically connected by bonding wires 405. However, the present disclosure is not limited to this example. The present disclosure is also applicable to liquid ejection heads in which the flexible substrates 404 and the terminals 10 are electrically connected by other connecting means.

The ejection port surface 201*a* of the liquid ejection chip 2 and the surfaces of the flexible substrates 404 on one side (the upper surfaces in FIG. 6) are fixed to the support member 401 with an adhesive agent (not illustrated). The support member 401 is fixed to the frame 403, which is fixed to the head main body 4 (FIG. 2A), via a peripheral sealing member 407. Thus, the liquid ejection chip 2 and the flexible substrates 404 are supported by and fixed to the frame 403 via the support member 401. An opening 402 is formed in the support member 401 at a position opposed to the area where the ejection ports 3 are formed, in order to allow ink ejection from the ejection ports 3.

Figure 7A:
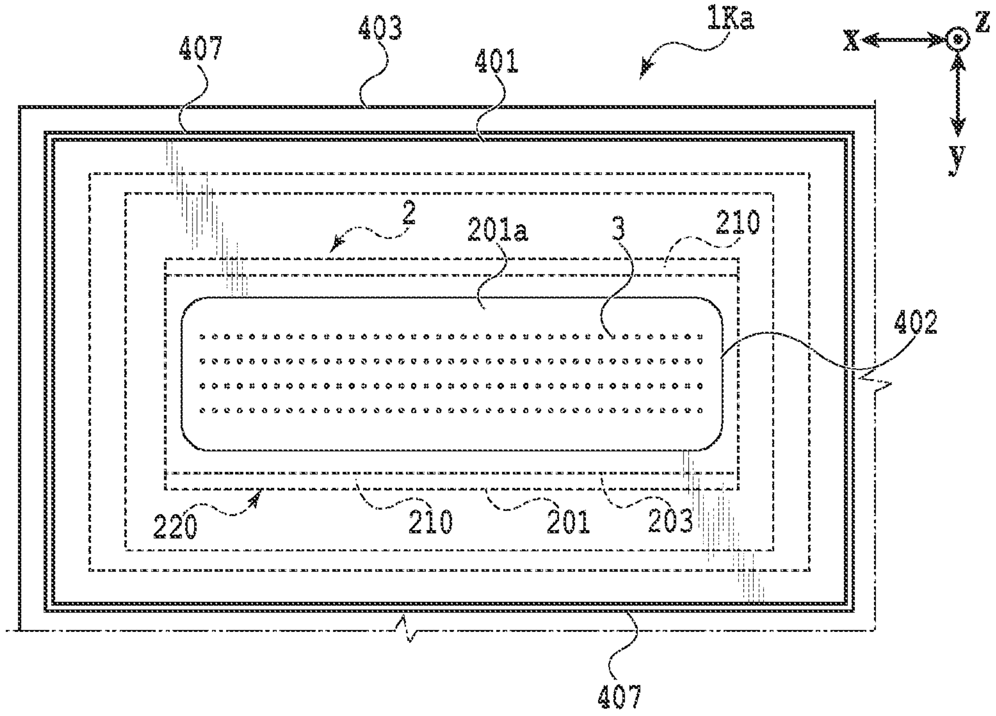
FIGS. 7A and 7B are a top view and a bottom view each illustrating a part of a head module.
Figure 7B:
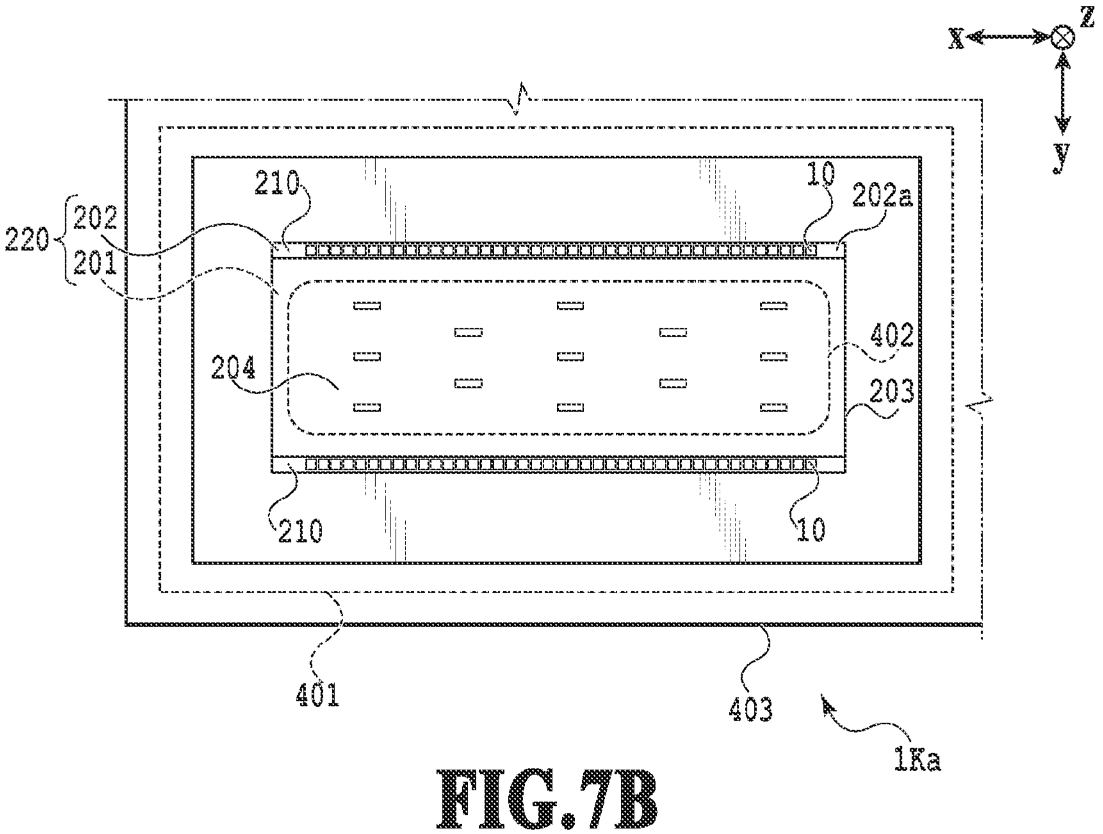

FIG. 7A is a top view of a part of the head module 1Ka as seen from the ejection port surface 201*a* side. Similarly, FIG. 7B is a bottom view of a part of the head module 1Ka as seen from the channel formation substrate 204 side. As illustrated in FIG. 7A, the support member 401 is formed so as to overlap the ejection port surface 201*a* and the cave portions 210 of the first substrate 220 in the planar direction. The eave portions 210 of the first substrate 220 are therefore supported and reinforced by the support member 401. Thus, although the eave portions 210 are formed at end portions of the thin first substrate 220, the support member 401 functions as a reinforcement member for the eave portions 210, thereby significantly lowering the possibility of breakage of the eave portions 210 by an external force. For example, the support member 401 prevents breakage of the eave portions by an impact generated by the wiping of the ejection port surface 201*a* or the like. This renders the head module 1Ka highly structurally reliable.

End portions of the support member 401 are bonded to the frame 403 via the peripheral sealing member 407. The frame 403 has a frame structure that supports the end portions of the support member 401. The frame 403 in the present embodiment is formed of a single member. The configuration to support the plurality of support members with the frame 403 formed of a single member is preferable in view of ensuring the planarity of the plurality of ejection port surfaces 201*a*. Nonetheless, the frame 403 can be formed separately for each support member 401. Also, the ejection port surface 201*a* has been subjected to a water-repellent treatment for preventing solidification of the ink, but it is preferable to remove the water repellency of the portion to be bonded to the support member 401 in order to improve the strength of adhesion with the adhesive agent.

The material of the sealing members 406 sealing the electric connection portions such as the terminals 10, the bonding wires 405, and the flexible substrates 404 is not particularly limited. However, the sealing members 406 usually have a thermosetting property and also have a higher coefficient of linear expansion than that of the liquid ejection chip 2. Thus, after the sealing members 406 cure, the eave portions 210 may be pulled in the direction opposite to the ink ejection direction by the thermal shrinkage of the sealing member 406. The support member 401 therefore needs to function as a reinforcement member capable of preventing the deformation of the eave portions 210 by the thermal shrinkage of the sealing members 406 or the like and preventing the deformation of the cave portions 210 by an external force as mentioned earlier. The support member 401 also needs to be made of such a material that the support member 401 itself does not get deformed by the heat of the bonding to the liquid ejection chip 2. To meet such requirements, it is preferable to use, for example, a material having high elasticity and a low coefficient of linear expansion, such as alumina or titanium, for the support member 401. Specifically, it is preferable to make the support member 401 from a material with a coefficient of linear expansion of 20 ppm/° C. or less.

Also, the thickness of the support member 401 is preferably 100 μm or more in order to exhibit a sufficient reinforcing effect on the eave portions 210. On the other hand, the interval between the ejection port surface 201*a* and the print medium 111 (FIG. 1) (hereinafter referred to as "head-to-medium distance") is preferably narrow in order to reduce errors in the landing of ink droplets on the print medium 111. Hence, the thickness of the support member 401, which is adjacent to the ejection port surface 201*a*, is preferably 300 μm or less. Specifically, the thickness of the support member 401 is preferably 100 μm or more and 300 μm or less.

Figure 8:
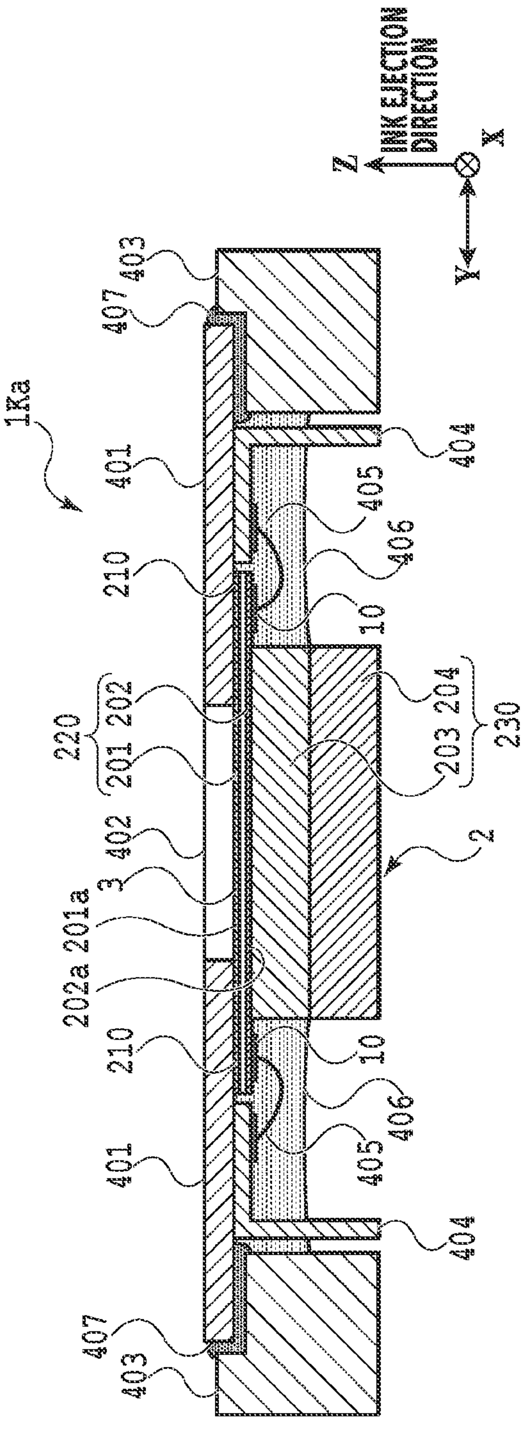
FIG. 8 is a cross-sectional view illustrating another example of the peripheral configuration of the liquid ejection chip in the first embodiment.

FIG. 6 illustrates an example in which the sealing members 406 are disposed only around the electric connection portions such as the terminals 10, the bonding wires 405, and the flexible substrates 404. Alternatively, the sealing members 406 may be disposed over the entire areas from the liquid ejection chip 2 to the frame 403, as illustrated in FIG. 8.

As described above, in the present embodiment, the eave portions 210 of the first substrate 220 are reinforced by the support member 401. This prevents breakage of the eave portions 210 even in a case of employing a configuration in which the first substrate 220 is thin, and thus renders the liquid ejection head structurally reliable.

Second Embodiment

Figure 9:
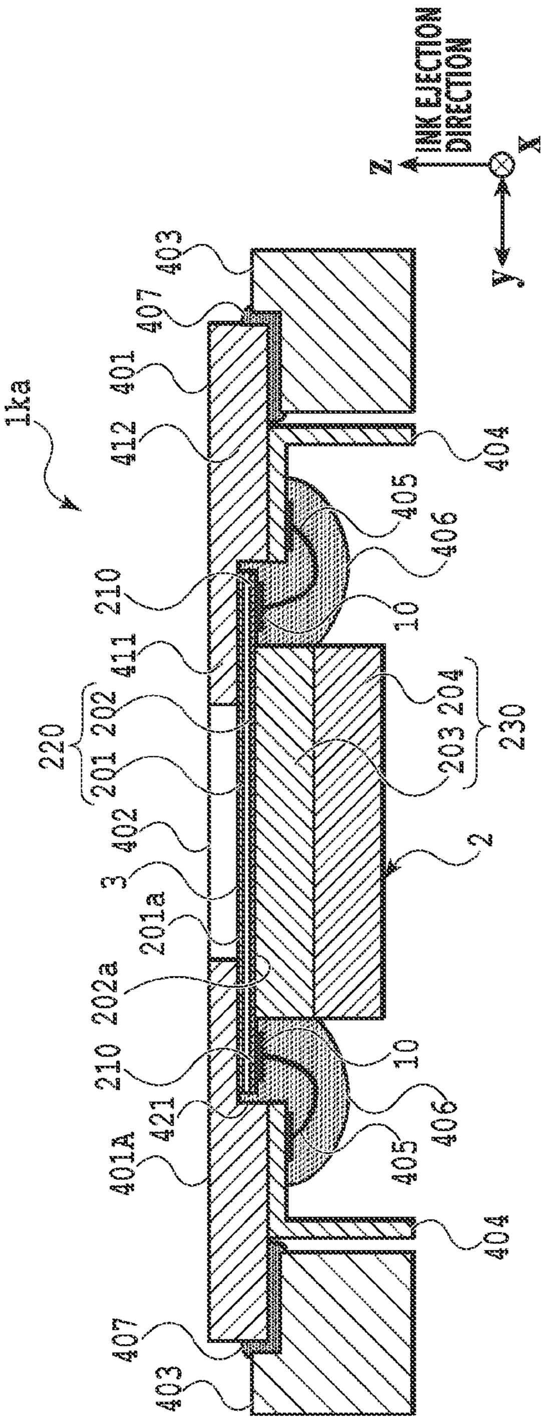
FIG. 9 is a cross-sectional view illustrating a peripheral configuration of a liquid ejection chip in a second embodiment.

Next, a second embodiment of the present disclosure will be described. FIG. 9 is a cross-sectional view illustrating a peripheral configuration of a liquid ejection chip 2 provided in a head module of a liquid ejection head in the second embodiment and, like FIG. 6, illustrates a part of a cross section taken along the VI-VI line in FIG. 2. Note that components in FIG. 9 similar to those in the first embodiment are denoted by the same reference signs, and description thereof is omitted.

The head module 1Ka in the present embodiment differs from that in the first embodiment in a cross-sectional shape of a support member 401A that supports the liquid ejection chip 2. On one surface (the lower surface in FIG. 9) of the support member 401A in the present embodiment, a step portion 421 is formed around the outer periphery of the opening 402. The area inward of the step portion 421 (first area) is a thin portion 411, and the area outward of the step portion 421 (second area) is a thick portion 412. As in the first embodiment, the support member 401A is bonded to an end portion of the frame 403 via the peripheral sealing member 407. Note that the front surface (the upper surface in FIG. 9) of the support member 401A is formed flat.

The liquid ejection chip 2 is bonded to the thin portion 411 of the support member 401A, and the flexible substrates 404 and the frame 403 are bonded to the thick portion 412. The thickness of the thin portion 411 is preferably 100 μm or more and 300 μm or less, as with the thickness of the support member 401 in the first embodiment. The thickness of the thick portion 412 is more than 300 μm on condition that it can electrically connect the flexible substrates 404 and the terminals 10.

As described above, in the present embodiment, the thick portion 412 is formed as a part of the support member 401A. This enhances the strength of the support member 401A and enables the eave portions 210 of the first substrate 220 to be supported more firmly. Accordingly, the structural reliability of the liquid ejection head is further improved. Also, the thickness of the support member 401A is similar to that in the first embodiment at the thin portion 411, to which the liquid ejection chip 2 is bonded. Hence, the interval between the front surface (the upper surface in FIG. 9) of the thin portion 411 and the ejection port surface 201*a* of the liquid ejection chip in the z-axis direction is the same as in the first embodiment. This enhances the structural reliability of the liquid ejection head without widening the distance between the print medium and the ejection port surface 201*a* (head-to-medium distance).

Note that the support member 401A having the thin portion 411 and the thick portion 412 as described above can be formed from a plurality of plate materials or from a single plate material. For example, the support member 401A having the step portion 421 can be formed by joining two plate materials each having an opening of a different size. Alternatively, the support member 401A having the step portion 421 can be formed by performing cutting, etching, or another process on a single plate material.

Third Embodiment

Figure 10:
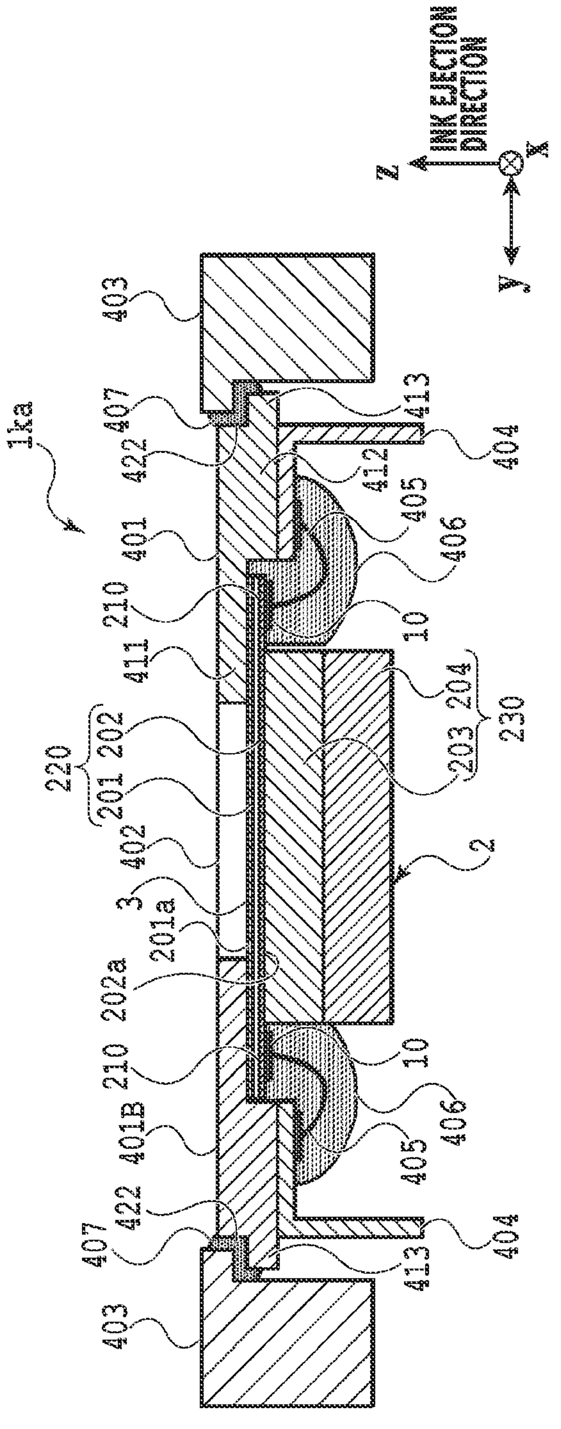
FIG. 10 is a cross-sectional view illustrating a peripheral configuration of a liquid ejection chip in a third embodiment.

Next, a third embodiment of the present disclosure will be described. FIG. 10 is a cross-sectional view illustrating a peripheral configuration of a liquid ejection chip 2 provided in a head module of a liquid ejection head in the third embodiment and, like FIG. 6, illustrates a part of a cross section taken along the VI-VI line in FIG. 2. Note that components in FIG. 10 similar to those in the second embodiment are denoted by the same reference signs, and description thereof is omitted.

As in the second embodiment described above, a support member 401B in the present embodiment has the thin portion 411 and the thick portion 412. Note that the support member 401B in the present embodiment is provided with a step portion 422 at end portions of the front surface (the upper surface in FIG. 10) of the thick portion 412, and the portion outward of the step portion 422 is a thin portion 413. One surface (the upper surface in FIG. 10) of this thin portion 413 is bonded to the frame 403 via the peripheral sealing member 407.

In the liquid ejection head in the present embodiment, only the end face of the frame 403 in the z-axis direction forms the surface situated foremost in the ink ejection direction (z-axis direction) (foremost surface). In this way, the dimensional accuracy and planarity of the foremost surface of the liquid ejection head are better than those with the configuration in which the plurality of support members 401 form foremost surfaces. Thus, a cap (not illustrated) for protecting the ejection port surfaces 201*a* of a liquid ejection head during a state where printing is stopped or a similar state can evenly contact the foremost surface of the liquid ejection head, thereby enhancing the tightness of contact of the cap with the liquid ejection head. Enhancing the tightness of contact of the cap prevents thickening of the ink inside the liquid ejection head more reliably.

Also, in the present embodiment, the thin portion 413 is provided at end portions of the support member 401B by forming the step portion 422 there, and this thin portion 413 is fixed to the frame 403. Accordingly, the amount of projection of the frame 403, which is the foremost surface of the liquid ejection head, in the ink ejection direction is smaller. This reduces the distance between the liquid ejection head and the print medium (head-to-medium distance).

Other Embodiments

In each of the above embodiments, an example in which a single liquid ejection head is formed of two head modules has been described. However, a single liquid ejection head can be formed of one head module or three or more head modules. Also, in the above embodiments, a liquid ejection apparatus (printing apparatus) including four liquid ejection heads for inks of four respective colors has been described. However, the number of liquid ejection heads to be mounted on the printing apparatus is not particularly limited. Moreover, the present disclosure is applicable also to a single print head having ejection port arrays for inks of a plurality of colors.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to improve the structural reliability of a liquid ejection head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-056933 filed Mar. 30, 2022, which is hereby incorporated by reference herein in its entirety.

What is claimed is:

1. A liquid ejection head comprising:
a first substrate having:
an ejection port for ejecting a liquid,
a liquid chamber communicating with the ejection port, and
an energy generation element that generates energy for ejecting the liquid in the liquid chamber through the ejection port along a first-axis direction; and
a second substrate which is laminated on a second surface of the first substrate, the second surface being on an opposite side to a first surface of the first substrate in which the ejection port is formed, and which includes individual channels communicating with the liquid chamber and common paths communicating with the individual channels,
wherein the first substrate includes a projecting area projecting from an end portion of the second substrate in a planar direction perpendicular to the first-axis direction, and a terminal to be electrically connected to the energy generation element is provided at the second surface of the projecting area, and
the liquid ejection head further comprises:
a support member joined to the first surface of the first substrate, having an opening at a position opposed to an area where the ejection port is formed, and supporting the first substrate to an extent that the support member extends beyond the projecting area of the first substrate; and
a frame which fixedly supports the support member at a portion overlapping an outer edge of the support member as viewed along the first-axis direction.

2. The liquid ejection head according to claim 1, wherein the support member has a longer dimension than the first substrate in at least one of a second-axis direction parallel to the planar direction and a third-axis direction parallel to the planar direction and perpendicular to the second-axis direction, and
the opening of the support member has shorter dimensions than the first substrate in the second-axis direction and the third-axis direction.

3. The liquid ejection head according to claim 1, wherein
the support member has a first area to be joined to the first surface of the first substrate and a second area situated outward of the first area, and
a thickness of the second area in the first-axis direction is larger than a thickness of the first area in the first-axis direction.

4. The liquid ejection head according to claim 3, wherein
the thickness of the first area in the first-axis direction is 100 μm or more and 300 μm or less, and
the thickness of the second area in the first-axis direction is more than 300 μm.

5. The liquid ejection head according to claim 1, wherein
the frame is joined to a thin portion formed at an end portion of the support member in the planar direction, and
an end face of the frame in the first-axis direction forms a foremost surface of the liquid ejection head.

6. The liquid ejection head according to claim 1 wherein the first surface of the first substrate is provided with a water-repellent treatment only on an area thereof facing the opening of the support member.

7. The liquid ejection head according to claim 1, wherein a coefficient of linear expansion of the support member is 20 ppm/° C. or less.

8. The liquid ejection head according to claim 1, wherein the support member has a thickness of 100 μm or more and 300 μm or less in the first-axis direction.

9. The liquid ejection head according to claim 1, wherein
the first substrate includes:
an ejection port substrate in which a plurality of the ejection ports are formed, and
a liquid chamber substrate which is joined to the ejection port substrate and forms liquid chambers respectively for the plurality of ejection ports between the ejection port substrate and the liquid chamber substrate,
the ejection port substrate forms the first surface, and
the liquid chamber substrate forms the second surface.

10. The liquid ejection head according to claim 9, wherein a total of a thickness of the liquid chamber substrate in the first-axis direction and a thickness of the ejection port substrate in the first-axis direction is 200 μm or less.

11. The liquid ejection head according to claim 9, wherein the second substrate includes a liquid supply substrate which is joined to the second surface of the liquid chamber substrate and in which a plurality of individual supply channels are formed, the plurality of individual supply channels being channels through which to supply the liquid respectively to the plurality of liquid chambers.

12. The liquid ejection head according to claim 11, wherein the liquid supply substrate includes a plurality of individual collection channels through which to respectively collect the liquid supplied to the plurality of liquid chambers.

13. The liquid ejection head according to claim 12, wherein the second substrate includes a common supply channel through which to supply the liquid to the plurality of individual supply channels.

14. The liquid ejection head according to claim 13, wherein the liquid supply substrate includes a common collection channel through which to collect the liquid from the plurality of individual collection channels.

15. A liquid ejection apparatus comprising:

a liquid ejection head; and a conveyance unit configured to convey a print medium with respect to the liquid ejection head, wherein the liquid ejection head includes:

a first substrate having:

an ejection port for ejecting a liquid, a liquid chamber communicating with the ejection port, and an energy generation element that generates energy for ejecting the liquid in the liquid chamber through the ejection port along a first-axis direction; and a second substrate which is laminated on a second surface of the first substrate, the second surface being on an opposite side to a first surface of the first substrate in which the ejection port is formed, and which includes individual channels communicating with the liquid chamber and common paths communicating with the individual channels, wherein the first substrate includes a projecting area projecting from an end portion of the second substrate in a planar direction perpendicular to the first-axis direction, and a terminal to be electrically connected to the energy generation element is provided at the second surface of the projecting area, and the liquid ejection head further comprises:

a support member joined to the first surface of the first substrate, having an opening at a position opposed to an area where the ejection port is formed, and supporting the first substrate to an extent that the support member extends beyond the projecting area of the first substrate; and a frame which fixedly supports the support member at a portion overlapping an outer edge of the support member as viewed along the first-axis direction.

* * * * *